United States Patent
Schmookler

(10) Patent No.: US 6,182,100 B1
(45) Date of Patent: Jan. 30, 2001

(54) METHOD AND SYSTEM FOR PERFORMING A LOGARITHMIC ESTIMATION WITHIN A DATA PROCESSING SYSTEM

(75) Inventor: Martin Stanley Schmookler, Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/106,942

(22) Filed: Jun. 30, 1998

(51) Int. Cl.⁷ .................................................. G06F 7/38
(52) U.S. Cl. ........................... 708/277; 708/495; 708/512
(58) Field of Search .................................... 708/277, 512, 708/517, 606, 495

(56) References Cited

U.S. PATENT DOCUMENTS

| | | | |
|---|---|---|---|
| 4,583,180 | * | 4/1986 | Kmetz .................................... 708/204 |
| 5,197,024 | * | 3/1993 | Pickett .................................... 708/517 |
| 5,365,465 | * | 11/1994 | Larson .................................... 708/204 |
| 5,524,089 | * | 6/1996 | Takano .................................... 708/517 |
| 5,570,310 | * | 10/1996 | Smith .................................... 708/517 |
| 5,652,584 | * | 7/1997 | Yoon .................................... 341/89 |

* cited by examiner

Primary Examiner—Chuong Dinh Ngo
(74) Attorney, Agent, or Firm—Casimer K. Salys; Felsman, Bradley, Vaden, Gunter & Dillon, LLP

(57) ABSTRACT

A method for performing a logarithmic estimation on a positive floating-point number within a data processing system is disclosed. A floating-point number includes a sign bit, multiple exponent bits, and a mantissa having an implied one and multiple fraction bits. A fraction part of an estimate is obtained via a table lookup utilizing the fraction bits of the floating-point number as input. An integer part of the estimate is obtained by converting the exponent bits to an unbiased representation. The integer part is then concatenated with the fraction part to form an intermediate result. Subsequently, the intermediate result is normalized to yield a mantissa, and an exponent part is produced based on the normalization. Finally, the exponent part is combined with the mantissa to form a floating-point result.

8 Claims, 3 Drawing Sheets

METHOD AND SYSTEM FOR PERFORMING A LOGARITHMIC ESTIMATION WITHIN A DATA PROCESSING SYSTEM

RELATED PATENT APPLICATION

The present patent application is related to a copending application U.S. Ser. No. 09/106,944 filed on even date, entitled "METHOD AND SYSTEM FOR PERFORMING A POWER OF TWO ESTIMATION WITHIN A DATA-PROCESSING SYSTEM" (Attorney Docket No. AT9-98-063).

BACKGROUND OF THE INVENTION

1. Technical Field

The present invention relates to a method and system for data processing in general, and in particular to a method and system for performing a numerical estimation within a data processing system. Still more particularly, the present invention relates to a method and system for performing a logarithmic estimation within a data processing system.

2. Description of the Prior Art

A general purpose processor typically cannot perform a logarithmic function as efficiently as other mathematical operations such as additions, subtractions, and multiplications. A logarithmic function is likely to require many more processor cycles than a relatively processor cycle-consuming multiplication operation. The present disclosure provides a method for performing a logarithmic estimation, i.e., $y = \log_2 x$, within a general purpose processor, where both the argument x and the result y are represented in a floating-point format. Without loss of generality, the floating-point format used for the purpose of illustration is the IEEE 754 format.

SUMMARY OF THE INVENTION

In view of the foregoing, it is therefore an object of the present invention to provide an improved method and system for data processing.

It is another object of the present invention to provide an improved method and system for performing a numerical estimation within a data processing system.

It is yet another object of the present invention to provide an improved method and system for performing a logarithmic estimation within a data processing system.

In accordance with a preferred embodiment of the present invention, a floating-point number includes a sign bit, multiple exponent bits, and a mantissa having an implied one and multiple fraction bits. A fraction part of an estimate is obtained via a table lookup utilizing the fraction bits of the floating-point number as input. An integer part of the estimate is obtained by converting the exponent bits to an unbiased representation. The integer part is then concatenated with the fraction part to form an intermediate result. Subsequently, the intermediate result is normalized to yield a mantissa, and an exponent part is produced based on the normalization. Finally, the exponent part is combined with the mantissa to form a floating-point result.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
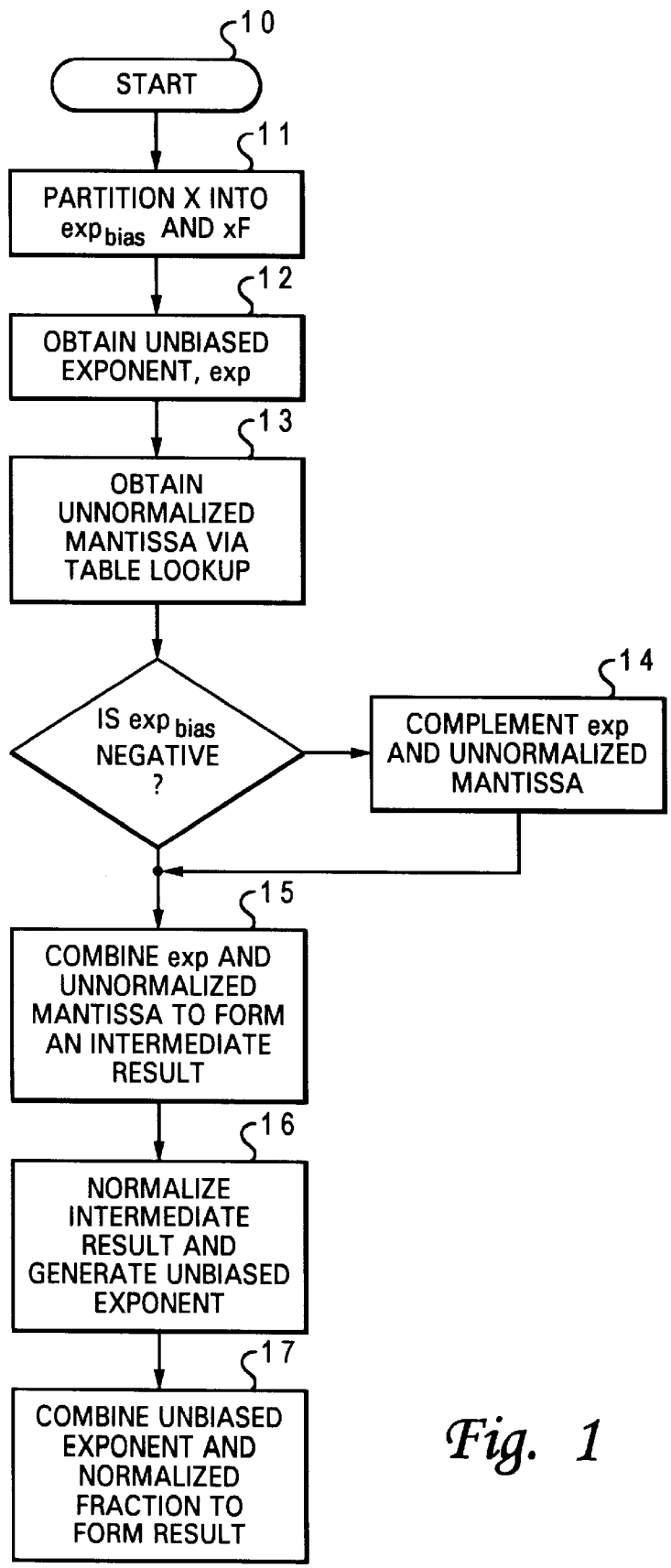
FIG. 1 is a high-level flow diagram illustrating a method for performing a logarithmic estimation within a data processing system, in accordance with a preferred embodiment of the present invention.

The present invention may be executed in a variety of data processing systems, including microprocessors and microcontrollers. For the purpose of illustration, a preferred embodiment of the present invention, as described below, may be implemented on a PowerPC™ processor manufactured by International Business Machines Corporation of Armonk, N.Y.

A. Overview

As mentioned previously, one of the objectives of the present invention is to provide a fast implementation of a $y = \log_2 x$ function within a general purpose floating-point processor, where x and y are 32-bit single precision floating-point numbers. According to the IEEE 754 format, a normalized floating-point number, such as x, is represented by three groups of bits, namely, a sign bit, exponent bits, and mantissa bits. The sign bit is the most significant bit of the floating-point number. The next eight less significant bits are the exponent bits, which represent a signed biased exponent of the floating-point number. An unbiased exponent can be computed by subtracting 127 from the biased exponent. The 23 least significant bits are the fraction bits; and the mantissa is computed by dividing these 23 bits with $2^{23}$ and adding 1.0 to the quotient.

Excluding the sign bit, a floating-point number x can be considered as a product of two parts corresponding to the exponent and the mantissa, respectively. The part corresponding to the exponent of x has the value $2^{exp}$, where exp is the unbiased exponent. Thus, $\log_2 x$ can be expressed by the sum of the logs of the above two parts (i.e., $\log_2 2^{exp} + \log_2$ mantissa). The $\log_2 2^{exp}$ is merely the unbiased exponent, exp, itself, which is a signed integer. The $\log_2$ mantissa is a positive fraction part of the floating-point result y, which can be denoted as yF. Because $1 \leq$ mantissa $< 2$, therefore $0 \leq yF < 1$, where $yF = \log_2$ mantissa. Thus, the floating-point result y can be obtained as follows:

$$y = exp + \log_2 \text{ mantissa}$$

where exp is the unbiased exponent of x, and mantissa is the mantissa of x.

If a graph of the $\log_2$ mantissa function is compared with a graph of a linear function (mantissa-1) within the range of 1 to 2 for the mantissa, it is observed that the results from the above two functions are identical at the endpoints, while the results from the $\log_2$ mantissa function is typically slightly greater than the results from the linear function between the endpoints. This relationship forms the basis for the present invention. Thus, if a logarithmic function with a low-precision estimation is needed, then the low-precision logarithmic function can be obtained simply by making small corrections to the linear function. On the other hand, if a logarithmic function with a higher precision estimation is required, the higher-precision logarithmic function can be obtained by means of a table lookup, sometimes in conjunction with point interpolation as is well-known to those skilled in the art.

Referring now to the drawings and in particular to FIG. 1, there is depicted a high-level flow diagram illustrating a method for performing a logarithmic estimation within a data processing system, in accordance with a preferred embodiment of the present invention. Starting at block 10, a floating-point number x, in the IEEE 754 format for example, is partitioned into a signed biased exponent part, $exp_{bias}$, and a fraction part, xF, as shown in block 11. An unbiased exponent, exp, is then obtained, such as by subtracting 127, from the biased exponent, as depicted in block 12. Next, an unnormalized mantissa is then obtained via a lookup table utilizing fraction part xF as the input, as illustrated in block 13. If the biased exponent part is negative, both the unbiased exponent and the unnormalized mantissa will be complemented, as depicted in block 14. The unbiased exponent is then concatenated with the unnormalized mantissa, with a binary point in between to form an immediate result, as shown in block 15. Subsequently, the immediate result is normalized by removing all leading zeros and the leading one, such as via left shifting, to obtain an normalized fraction part of the result y, and the exponent part of the result y is then generated by, for example, counting the number of leading digits shifted off and then subtracting that number from 8, as illustrated in block 16. At this point, the exponent part of the result y is unbiased. Finally, the floating-point result y is formed by combining the unbiased exponent part and the normalized faction part, as shown in block 17. A biased exponent can be obtained by adding 127 to the unbiased exponent.

Figure 2:
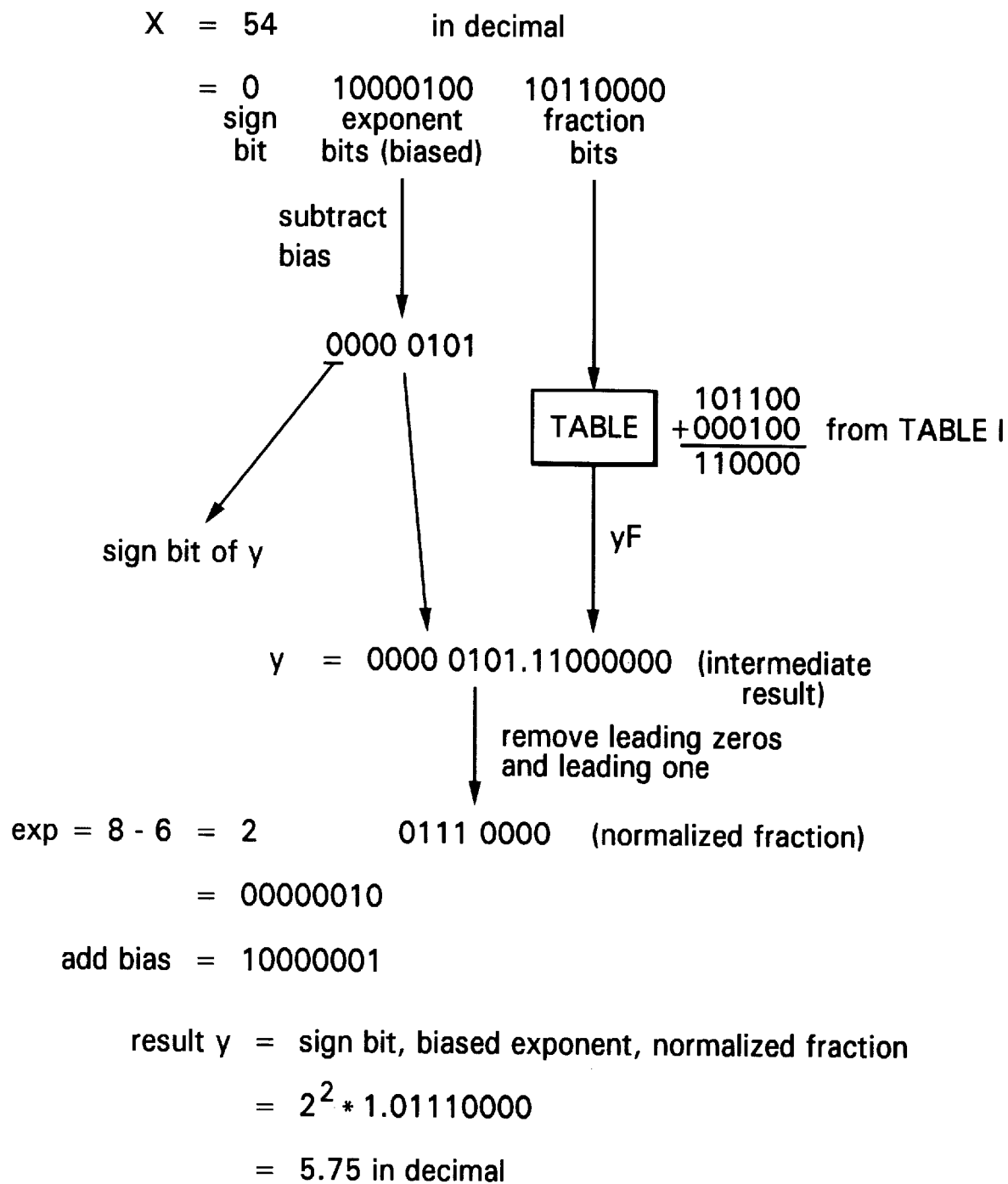
FIG. 2 is an example illustrating a method for performing a logarithmic estimation within a data processing system, in accordance with a preferred embodiment of the present invention.

With reference now to FIG. 2, there is depicted an example illustrating a method for performing a logarithmic estimation within a data processing system, in accordance with a preferred embodiment of the present invention. An input x for which the logarithmic value is desired, can be represented in a floating-point format, as follows:

$$(-1)^{sign} * 2^{exp_{bias}-127} * mantissa$$

where sign is a sign bit, $exp_{bias}$ is a signed biased exponent, and mantissa is equal to 1.fraction. Thus, if x equals 54 in decimal, $x=(-1)^0 * 2^5 * 1.10110000$, or 0 1000 0100 1011 0000 in floating-point binary form, where 1000 0100 is the biased exponent and 1011 0000 is the fraction. An unbiased exponent can be obtained by subtracting 127 from the biased exponent, yielding 0000 0101. Because the unbiased exponent is positive, the sign bit of the result y equals 0. An unnormalized mantissa can be obtained by utilizing a table lookup (such as Table I shown below) with the fraction bits as the input. In this case, the last row of Table I is utilized. The unbiased exponent is then concatenated with the unnormalized mantissa, with a binary point in between, to form an intermediate result. The value of the intermediate result equals 0000 0101.1100 0000, with 0000 0101 as the unbiased exponent and 1100 0000 as the unnormalized mantissa.

The intermediate result is subsequently normalized in order to obtain the fraction part of the floating-point result y. The normalization can be performed by left shifting the intermediate result to remove all leading zeros and the leading one. The leading one is considered as the implied "1." The exponent part of the result y can be obtained either by subtracting the number of leading digits (i.e., the leading zeros and the leading one) shifted off from 8, or by subtracting 1 from the number of significant bits to the left of the binary point of the unnormalized mantissa. In this example, the shifting method is utilized to remove a total of six bits. Thus, the exponent of the result y should equal 8−6=2 or 0000 0010 in binary; and the fraction part becomes 0111 0000. After adding the bias 127 to the exponent, the biased exponent becomes 1000 0001. Finally, the result y can be obtained by combining the sign bit, the biased exponent, and the normalized fraction to yield 0 1000 0001 0111 0000 or 5.75 in decimal. The error of this estimated floating-point result y is 0.085% when compared with the precise result of 5.7549.

B. Implementation

Figure 3:
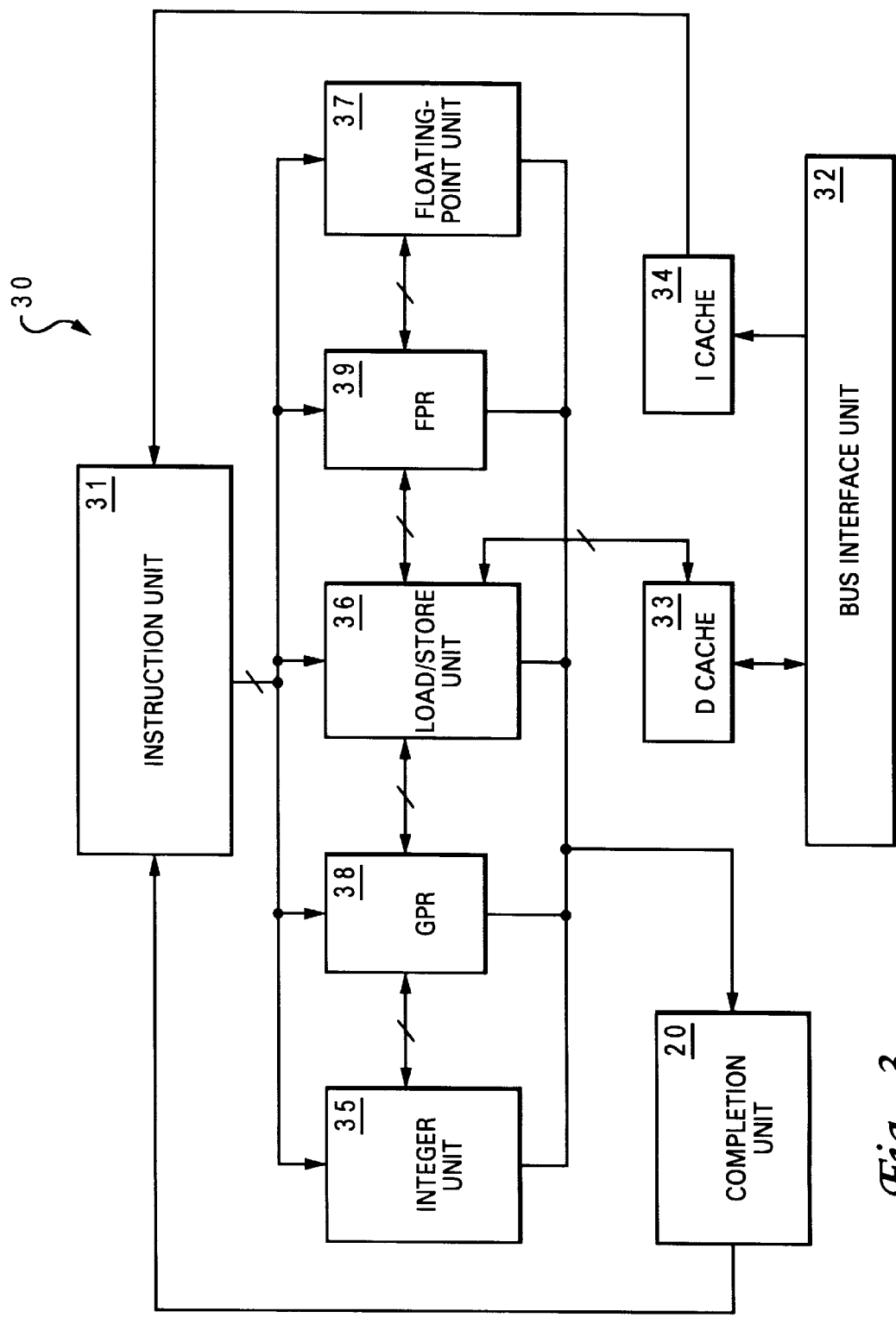
FIG. 3 is a block diagram of a general purpose processor in which a preferred embodiment of the present invention may be incorporated.

Referring now to FIG. 3, there is depicted a block diagram of a general purpose processor in which a preferred embodiment of the present invention may be incorporated. Within a processor 30, a bus interface unit 32 is coupled to a data cache 33 and an instruction cache 34. Both data cache 33 and instruction cache 34 are high speed set-associative caches which enable processor 30 to achieve a relatively fast access time to a subset of data or instructions previously transferred from a main memory (not shown). Instruction cache 34 is further coupled to an instruction unit 33 which fetches instructions from instruction cache 34 during each execution cycle.

Processor 30 also includes at least three execution units, namely, an integer unit 35, a load/store unit 36, and a floating-point unit 37. Each of execution units 35–37 can execute one or more classes of instructions, and all execution units 35–37 can operate concurrently during each processor cycle. After execution of an instruction has terminated, execution units 35–37 store data results to a respective rename buffer, depending upon the instruction type. Then, any one of execution units 35–37 can signal a completion unit 20 that the instruction execution is finished. Finally, instructions are completed in program order by transferring result data from the respective rename buffer to a general purpose register 38 or a floating-point register 39, accordingly.

The present invention can be incorporated within the floating-point data flow of processor 30, such as the floating-point multiply-add function contained within floating-point unit 37. In addition, the steps described herein can be pipelined to enable a new instruction to begin at every cycle, as long as the new instruction is not delayed by a data dependency on a previous instruction.

A method for performing a logarithm estimation within processor 10 is implemented with the following steps, some of which can be done concurrently:

Step 1a: Obtain exp in an unbiased signed integer form by subtracting 127 from the biased exponent $exp_{bias}$ of the floating-point input x. This step can be done by using an exponent adder often already available in floating-point unit 37 for use in performing other operations.

TABLE I

| x[1:5] | yF[1:12] |
|---|---|
| 00000, 11111 | yF[1:6] = x[1:6] |
| 00001 | yF[1:6] = x[1:6] + 000001 |
| 0001*, 1101*, 11100 | yF[1:6] = x[1:6] + 000010 |
| 0010* | yF[1:6] = x[1:6] + 000011 |

TABLE I-continued

| x[1:5] | yF[1:12] |
|---|---|
| 1100* | yF[1:5] = 11010; |
|  | yF[6:12] = x[5:11] |
| 11101 | yF[1:6] = 111100; |
|  | yF[7:12] = x[6:11] |
| 11110 | yF[1:6] = 111101; |
|  | yF[7:12] = x[6:11] |
| all other cases | yF[1:6] = x[1:6] + 000100 |

An "*" in the column for x[1:5] in Table I means either 0 or 1. Also, unless explicitly shown in Table I, yF[7:12]=x[7:12].

Step 1b: Obtain a fraction yF via a table lookup, such as Table I, using the fraction bits of x as input.

Step 2: Concatenate exp, an integer, to the fraction yF to form an intermediate result y, i.e., $y_{int}$=exp+yF[1:12]= exp.yF[1:12].

Step 3: If exp is negative in a two's complement form, then the two's complement of $y_{int}$ is taken, using the means for complementing the intermediate result in floating-point addition when it is negative, and set the sign of the result y to 1.

Step 4: Normalize $y_{int}$ to get the most significant bit into the implied bit position. The number of significant bits in exp is determined by how many bits $y_{int}$ have been left-shifted. The number of shifted-off bits (including all leading zeros and a leading one) is then subtracted from 8.

Step 5: Obtain the biased exponent of the result y by adding 127 to the unbiased exponent, which can be done using the exponent adder normally utilized to adjust the exponent after normalization.

In sum, the value of floating-point result y can be obtained from: exp+yF[1:12], where exp is an unbiased signed exponent of a floating-point input x, and yF[1:12] is a positive fraction that can be derived from a table using only x[1:12]. The remaining bits of input x are ignored. Note that, if x[1:12] are all 0's and exp equals zero, then x[13:23] will be significant in a floating-point representation. Similarly, if x[1:12] are all 1's and exp equal −1, then x[13:23] will also be significant in the same floating-point representation. In either one of the above cases, a zero result will be returned.

As has been described, the present invention provides an improved method and system for performing a logarithmic estimation within a data processing system. Although a low-precision logarithmic estimation is described, it is well understood that higher-precision logarithmic estimation can easily be obtained with the same principle as disclosed. Despite its low-precision, the present implementation produces a monotonic result, which is desirable for most applications. Even with the low-precision implementation, if the fraction of input x equals zero, then a precise result will always be produced.

When the input value x is very close to one, then its logarithmic value is close to zero, and it is difficult to guarantee a relatively high precision. In the implementation described above, the result is guaranteed to have an absolute error of less than one part in 32. The relative error is guaranteed to be less than one part in eight, except when input x is within the range $7/8<x<1\frac{1}{8}$. Somewhat higher precision within the above range can be obtained by multiplying (x−1) by 1.44, which is the $\log_2 e$ equivalent to 1/ln2. A binary multiplier $1.0111_b$ equal to 1.4375 can be utilized to obtain a better result with minimum hardware.

Further, if an unbiased exponent, exp, is defined as exp=$\exp_{bias}$−127, then the floating-point number will have a normal range of values when −126≦exp≦+127. The IEEE 754 format also includes a range of values called the denormal range, where $\exp_{bias}$=0 and the mantissa= 0.fraction; however, the present disclosure will not explicitly deal with values in that range. For the logarithm function, input x is not restrained to a small range. In fact, input x can even be a denormal floating-point number, although such a case is not explicitly shown in the present disclosure.

While the invention has been particularly shown and described with reference to a preferred embodiment, it will be understood by those skilled in the art that various changes in form and detail may be made therein without departing from the spirit and scope of the invention.

What is claimed is:

1. A method for executing a floating-point instruction, said method comprising the steps of:
    storing a floating-point number within a memory of a data processing system having a processor, wherein said floating-point number includes a sign bit, a plurality of exponent bits, and a mantissa having an implied one and a plurality of fraction bits;
    in response to a floating-point instruction:
        obtaining a fraction part of an estimate number via a table lookup utilizing said fraction bits of said floating-point number as input;
        obtaining an integer part of said estimate number by converting said exponent bits to an unbiased representation;
        concatenating said integer part with said fraction part to form an intermediate result;
        normalizing said intermediate result to yield a mantissa, and producing an exponent part based on said normalizing step;
        combining said exponent part and said mantissa to form a floating-point result; and
    storing said floating-point result in said memory.

2. The method according to claim 1, wherein said method further includes a step of complementing said intermediate result if unbiased exponent of said floating-point number is negative.

3. The method according to claim 1, wherein said normalizing step further includes a step of removing leading zeros and a leading one from said intermediate result.

4. The method according to claim 3, wherein said method further includes a step of subtracting the number of leading zeros and said leading one in said removing step from 8.

5. A processor capable of performing a logarithmic estimation on a floating-point number, wherein said floating-point number includes a sign bit, a plurality of exponent bits, and a mantissa having an implied one and a plurality of fraction bits, said processor comprising:
    means for generating a fraction part of an estimate number via a lookup table utilizing said fraction bits of said floating-point number as input;
    means for obtaining an integer part of said estimate number by converting said exponent bits to an unbiased representation;

means for concatenating said integer part with said fraction part to form an intermediate result;

means for normalizing said intermediate result to yield a mantissa, and producing an exponent part based on the normalization; and means for combining said exponent part and said mantissa to form a floating-point result.

6. The processor according to claim 5, wherein said processor further includes a means for complementing said intermediate result if said floating-point number is negative.

7. The processor according to claim 5, wherein said normalizing means further includes a means for removing leading zeros and a leading one from said intermediate result.

8. The processor according to claim 7, wherein said processor further includes a means for subtracting the number of leading zeros and said leading one in said removing step from 8.

* * * * *